3,067,236
TRIS(PENTAHALOPHENYL) BORATES
Frederick H. Norton, Concord, Calif., assignor to The Dow Chemical Company, Midland, Mich., a corporation of Delaware
No Drawing. Filed Feb. 20, 1961, Ser. No. 90,241
7 Claims. (Cl. 260—462)

This invention relates to tris(pentahalophenyl) borates as new chemical compounds and to a process for their preparation.

The tris(pentahalophenyl) borates related to in the present invention are those wherein the halogens are chlorine or bromine.

The novel compounds of the present invention are conveniently prepared by reacting boron trichloride with a pentahalophenol wherein the halogens are chlorine or bromine. The reaction is carried out desirably in a solvent medium, the solvent being inert under the reaction conditions. Operable temperatures for the reaction are from 0° to about 100° C., with 25° to about 40° C. being the preferred range. The reaction proceeds smoothly and at higher operating temperatures will be completed in two or three hours. The end of the reaction is normally indicated by the cessation of the evolution of by-product hydrogen halide gas. When the reaction is completed, any remaining hydrogen halide gas, any unreacted boron trichloride, and the solvent are conveniently removed, as by distillation, and the desired product recovered from the reaction mixture, conveniently by filtration.

The solvent for the reaction is one that is inert under the reaction conditions and preferably one whose boiling point is about the reaction temperature to be used. Operable solvents for the reaction include benzene, toluene, xylene and aliphatic hydrocarbons, such as n-hexane.

The pressure for the reaction is not critical; atmospheric pressure is most conveniently employed and therefore preferable, but pressures deviating from atmospheric may be used.

The reactants for the process of the invention are added to the reaction vessel preferably in the ratio of at least 3 moles of pentahalophenol per mole of boron trichloride.

Because of the tendency of the tris(pentahalophenyl) borates to hydrolyze, thus lowering the yield of desired product, it is desirable to carry out the process under anhydrous conditions. The starting material should be as free of water as possible and precautions should be taken to prevent the entry of water into the system.

The practice of the present invention is illustrated by the following examples.

*Example I*

13.3 grams (0.05 gram-mole) of pentachlorophenol and 120 ml. of benzene were added to a 250-ml. flask and refluxed and a small amount of benzene was distilled from the reaction vessel to remove any traces of water. Dry nitrogen gas was then introduced into the system at a slow rate to serve as a carrier for the boron trichloride. A —50° C. dry reflux condenser was inserted into the system and 1.8 gram (0.016 gram-mole) of boron trichloride was introduced into the nitrogen line and passed into the top of the flask. After the boron trichloride was added, the nitrogen flow was stopped. The temperature of the reaction mixture was 30°–35° C. at this point. The HCl gas formed from the reaction was passed through the condenser, thence into a trap and into 1 N aqueous sodium hydroxide solution. The reaction temperature was increased to 35–40° C. and the product gradually precipitated from solution. The reaction mixture was then heated until the benzene refluxed (approximately 82° C.). The temperature of the condenser was increased to 20° C. to allow HCl gas and any unreacted $BCl_3$ to escape, a brief purge with nitrogen being used to complete their removal. Upon standing overnight and then filtering there were obtained from the reaction flask 8.22 grams of white crystals of tris(pentachlorophenyl) borate having a melting point of 268°–270° C. and representing a yield of 68 percent of theoretical.

*Example II*

54.1 grams (0.11 gram-mole) of anhydrous pentabromophenol were dissolved in 400 ml. of dry benzene at 70° C. and 4.3 grams (.037 gram-mole) of anhydrous boron trichloride were then passed into the flask at 66°–70° C. with stirring. After the addition was completed, the solution was boiled to remove HBr gas and traces of boron trichloride. The reaction mixture was cooled to 30° C., filtered using vacuum, and the filtration residue was vacuum dried to give 30.2 grams of light tan crystals having a melting point of 275°–300° C. and representing a yield of 55 percent of the theoretical.

The novel compounds of the present invention have demonstrated outstanding utility as miticides, insecticides, post-emergent herbicides, aquatic herbicides, fungicides, and for killing certain species of aquatic animals.

The novel borates have been proven to be excellent aquatic herbicides. The tris(pentachlorophenyl) borate and the tris(pentabromophenyl) borate were evaluated for herbicidal effect on *Anacharis sp.* (waterweed) and *Cabomba caroliniana* (fanwort), and the tris(pentabromophenyl) borate was evaluated for herbicidal effect on *Lysimastrum nummularia* (moneywort), *Ceratophyllum sp.* (coontail) and *Salvinia rotundifolia* (salvinia). A series of each of the above species were placed in small mesh baskets, each of which was placed in an individual plastic box containing an aqueous dispersion of the novel borate as designated, the chloro-borate being used in a concentration of 100 p.p.m. and the bromo-borate being employed at 10 p.p.m. concentration. The plants were immersed in the test solutions for from 2 to 24 hours, then removed, rinsed with tap water and placed in tanks of clear water. Inspection of the plants and comparison of them with untreated controls showed that of the plants treated with the borates there had been a 100 percent kill effected.

I claim:
1. Tris(pentahalophenyl) borates wherein the halogen substituents have an atomic number from 17 to 35.
2. Tris(pentachlorophenyl) borate.
3. Tris(pentabromophenyl) borate.
4. A process for preparing a tris(pentahalophenyl) borate, comprising reacting by contacting $BCl_3$ at a temperature of from 0°–100° C. with a pentahalophenol wherein the halogen substituents have an atomic number from 17 to 35 and separating the thus formed tris(pentahalophenyl) borate from the reaction mixture.
5. A process as in claim 4 wherein the reaction is carried out in an inert solvent.
6. A process as in claim 4 wherein the temperature for the reaction is maintained at from about 25° C. to about 40° C.
7. A process as in claim 5 wherein the inert solvent is benzene.

References Cited in the file of this patent
UNITED STATES PATENTS
2,154,098    Loane et al. _____ Apr. 11, 1939

OTHER REFERENCES
Colclough et al.: J. Chem. Soc. (London), pages 3006 to 3010 (1956).